US006928590B2

(12) United States Patent
Ilkbahar et al.

(10) Patent No.: US 6,928,590 B2
(45) Date of Patent: Aug. 9, 2005

(54) MEMORY DEVICE AND METHOD FOR STORING BITS IN NON-ADJACENT STORAGE LOCATIONS IN A MEMORY ARRAY

(75) Inventors: Alper Ilkbahar, San Jose, CA (US); Roy E. Scheuerlein, Cupertino, CA (US); Derek J. Bosch, Mountain View, CA (US)

(73) Assignee: Matrix Semiconductor, Inc., Santa Clara, CA (US)

( * ) Notice: Subject to any disclaimer, the term of this patent is extended or adjusted under 35 U.S.C. 154(b) by 638 days.

(21) Appl. No.: 10/024,647

(22) Filed: Dec. 14, 2001

(65) Prior Publication Data

US 2003/0115514 A1 Jun. 19, 2003

(51) Int. Cl.⁷ .................................................. G06F 11/00
(52) U.S. Cl. ........................................ 714/49; 711/202
(58) Field of Search ............................ 714/49, 50, 701, 714/702; 711/202

(56) References Cited

U.S. PATENT DOCUMENTS

| | | |
|---|---|---|
| 4,646,266 A | 2/1987 | Ovshinsky et al. |
| 5,313,425 A | 5/1994 | Lee et al. |
| 5,432,729 A | 7/1995 | Carson et al. |
| 5,469,450 A | 11/1995 | Cho et al. |
| 5,708,667 A | 1/1998 | Hayashi |
| 5,784,391 A | 7/1998 | Konigsburg |
| 5,796,694 A | 8/1998 | Shirane |
| 5,835,396 A | 11/1998 | Zhang |
| 5,835,509 A | 11/1998 | Sako et al. |
| 5,872,790 A | 2/1999 | Dixon |
| 5,878,203 A * | 3/1999 | Matsumoto et al. ........... 714/6 |
| 5,943,254 A | 8/1999 | Bakeman, Jr. et al. |
| 6,016,269 A | 1/2000 | Peterson et al. |
| 6,034,882 A | 3/2000 | Johnson et al. |
| 6,185,122 B1 | 2/2001 | Johnson et al. |
| 6,216,247 B1 | 4/2001 | Creta et al. |
| 6,236,587 B1 | 5/2001 | Gudesen et al. |

FOREIGN PATENT DOCUMENTS

WO    WO 99/14763    3/1999

OTHER PUBLICATIONS

"Construction Techniques for Systematic: SEC–DED Codes with Single Byte Error Detection and Partial Correction Capability for Computer Memory Systems," Penzo et al., IEEE Transactions on Information Theory, vol. 41, No. 2, Mar. 1995, pp. 584–591.

(Continued)

Primary Examiner—Bryce P. Bonzo
(74) Attorney, Agent, or Firm—Brinks Hofer Gilson & Lione (57) ABSTRACT

The preferred embodiments described herein provide a memory device and method for storing bits in non-adjacent storage locations in a memory array. In one preferred embodiment, a memory device is provided comprising a register and a memory array. A plurality of bits provided to the memory device are stored in the register in a first direction, read from the register in a second direction, and then stored in the memory array. Bits that are adjacent to one another when provided to the memory device are stored in non-adjacent storage locations in the memory array. When the plurality of bits takes the form of an ECC word, the storage of bits in non-adjacent storage locations in the memory array reduces the likelihood of an uncorrectable multi-bit error. In another preferred embodiment, a memory device is provided comprising a memory array and a register comprising a first set of wordlines and bitlines and a second set of wordlines and bitlines arranged orthogonal to the first set. In yet another preferred embodiment, memory decoders or a host device is used to store bits in non-adjacent storage locations in a memory array of a memory device. Other preferred embodiments are provided, and each of the preferred embodiments described herein can be used alone or in combination with one another.

34 Claims, 7 Drawing Sheets

OTHER PUBLICATIONS

"Computer Engineering: Hardware Design," M. Morris Mano, Chapter 6–4 Error Detection and Correction, pp. 199–202 (1988).

"Reed–Solomon Codes," http://www.4i2i.com/reed_solomon_codes.htm, 8 pages (1998).

"The Norton Desktop (Version 3 For Windows) User's Guide," pp. 16–1–16–6 (1993).

"Exotic Memories, Diverse Approaches," EDN Asia, pp. 22–33 (Sep. 2001).

"A Vertical Leap for Microchips," Thomas H. Lee, Scientific American, 8 pages (Jan. 2002; printed Dec. 10, 2001).

"Three–Dimensional Memory Array and Method of Fabrication," U.S. Appl. No. 09/560,626, filed Apr. 28, 2000; inventor: Johan Knall.

"Write–Once Memory Array Controller, System, and Method," U.S. Appl. No. 09/638,427, filed Aug. 14, 2000; inventors: Derek J. Bosch, Christopher S. Moore, Daniel C. Steere, and J. James Tringali.

"Low–Cost Three–Dimensional Memory Array," U.S. Appl. No. 09/638,428, filed Aug. 14, 2000; inventors: Mark G. Johnson, Thomas H. Lee, Vivek Subramanian, and P. Michael Farmwald.

"Modular Memory Device," U.S. Appl. No. 09/638,334, filed Aug. 14, 2000; inventors: J. James Tringali, P. Michael Farmwald, Thomas H. Lee, Mark G. Johnson, and Derek J. Bosch.

"Memory Devices and Methods for Use Therewith," U.S. Appl. No. 09/748,589, filed Dec. 22, 2000; inventors: Roger W. March, Christopher S. Moore, Daniel Brown, Thomas H. Lee, and Mark G. Johnson.

"Three–Dimensional Memory Array and method for Storing Data Bits and ECC Bits Therein," U.S. Appl. No. 09/747,574, filed Dec. 22, 2000; inventors: Thomas H. Lee, James M. Cleeves, and Mark G. Johnson.

"Method for Deleting Stored Digital Data from Write–Once Memory Device," U.S. Appl. No. 09/638,439, filed Aug. 14, 2000; inventors: Christopher S. Moore, Derek J. Bosch, Daniel C. Steere; and L. James Tringali.

"Solid–State Memory Device Storing Program Code and Methods for Use Therewith," U.S. Appl. No. 09/775,745, filed Feb. 2, 2001; inventors: Christopher S. Moore, Roger March, Dan Brown.

* cited by examiner

MEMORY DEVICE AND METHOD FOR STORING BITS IN NON-ADJACENT STORAGE LOCATIONS IN A MEMORY ARRAY

BACKGROUND

Error correcting code ("ECC") schemes are widely used in large memory arrays to detect and/or correct errors in the memory array due to imperfections such as manufacturing defects, design marginalities, or loss of data due to alpha particle collisions. In conventional ECC schemes, syndrome bits are generated at the time data bits are stored in the memory array, and these bits are stored along with the data bits as an ECC word. When read back from the memory array, the ECC scheme evaluates the data and syndrome bits to check the integrity of the ECC word. Commonly-used ECC schemes can detect multi-bit errors and correct single-bit errors. Typically, the bits of the ECC word are stored in close physical proximity in the memory array to simplify the physical design of the memory circuits. With commonly-used ECC schemes, if a local defect impacts only a single-bit location, the error will be corrected. However, some manufacturing defects affect multiple bits in close proximity to one another. If the defect hits several bit locations in an ECC word, commonly-used ECC schemes will not be able to correct the resulting multi-bit errors, and the data in the ECC word will be lost. This problem results in reduced yield and/or reliability of the memory device.

There is a need, therefore, for a method for storing bits in non-adjacent storage locations in a memory array that can be used to improve yield and reliability in memory devices that use error detection and/or correction schemes.

SUMMARY

The present invention is defined by the following claims, and nothing in this section should be taken as a limitation on those claims.

By way of introduction, the preferred embodiments described below provide a memory device and method for storing bits in non-adjacent storage locations in a memory array. In one preferred embodiment, a memory device is provided comprising a register and a memory array. A plurality of bits provided to the memory device are stored in the register in a first direction, read from the register in a second direction, and then stored in the memory array. Bits that are adjacent to one another when provided to the memory device are stored in non-adjacent storage locations in the memory array. When the plurality of bits takes the form of an ECC word, the storage of bits in non-adjacent storage locations in the memory array reduces the likelihood of an uncorrectable multi-bit error. In another preferred embodiment, a memory device is provided comprising a memory array and a register comprising a first set of wordlines and bitlines and a second set of wordlines and bitlines arranged orthogonal to the first set. In yet another preferred embodiment, memory decoders or a host device is used to store bits in non-adjacent storage locations in a memory array of a memory device. Other preferred embodiments are provided, and each of the preferred embodiments described herein can be used alone or in combination with one another.

The preferred embodiments will now be described with reference to the attached drawings.

DETAILED DESCRIPTION OF THE PRESENTLY PREFERRED EMBODIMENTS

By way of overview, the preferred embodiments described herein provide a memory device and method for storing bits in non-adjacent storage locations in a memory array. In one preferred embodiment, the memory device comprises a register and a memory array coupled with the register. As used herein, the term "coupled with" means directly coupled with or indirectly coupled with through one or more named or unnamed components. The register is used to temporarily store bits provided to the memory device before they are stored in the memory array. In this preferred embodiment, bits that are adjacent to one another when provided to the memory device are stored in non-adjacent storage locations in the memory array due to the way in which the bits are stored in and read from the register. These preferred embodiments can be used to improve yield and reliability in memory devices that use error detection and/or correction schemes.

Figure 1A:
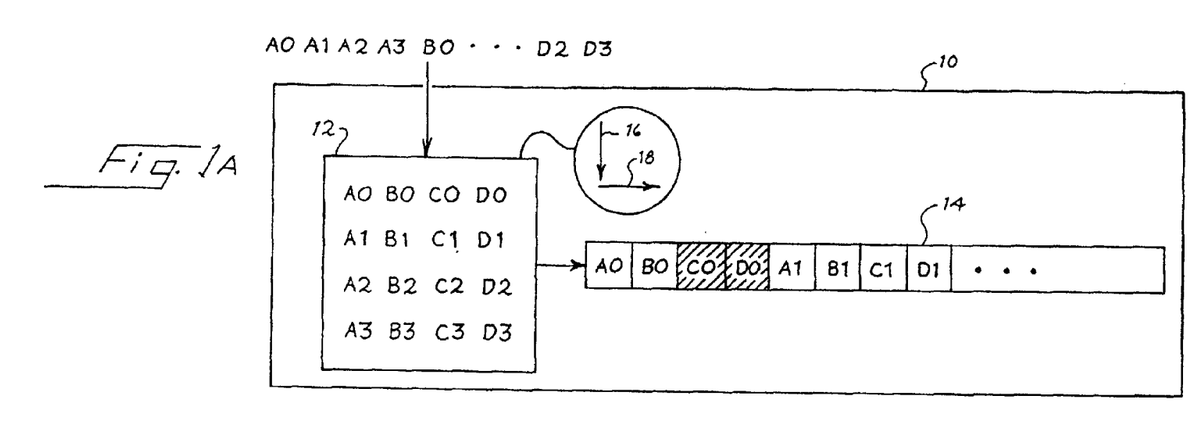
FIG. 1A is an illustration of a memory device of a preferred embodiment comprising a memory array and a register that stores and reads bits in different directions.

Turning now to the drawings, FIG. 1A is an illustration of a memory device 10 comprising a register 12 and a memory array 14 that will illustrate the operation of a preferred embodiment. A plurality of bits (A0 A1 A2 A3 B0 ... D2 D3) are provided to the memory device 10 for storage in the memory array 14. The plurality of bits are arranged adjacent to one another (i.e., A0 is next to A1, A1 is next to A2, B3 is next to B4, etc.). Before the bits are stored in the memory array 14, they are temporarily stored in the register 12. Due to the way in which the bits are stored in and read from the register 12, bits that are adjacent to one another when provided to the memory device 10 are stored in non-adjacent storage locations in the memory array 14. Specifically, sequential bits in the data stream are stored in the register 12 in one direction and read out of the register 12 and into the memory array 14 in a different direction. In this example, the plurality of bits are stored in the register 12 from top to bottom (a "first direction," as depicted by arrow 16) and are read from the register 12 from left to right (a "second direction," as depicted by arrow 18). While the first and second directions are orthogonal to each other in this illustration, the first and second directions can take different forms. For example, one direction can run diagonally, and the other direction can run top-to-bottom or left-to-right. Additionally, the term "direction" is meant to broadly refer to a path and does not necessarily refer to a linear vector (e.g., a zig-zag path can be considered a "direction"). The register 12 is also used to temporarily store bits that are read from the memory array 14 before they are outputted from the memory device 10. To provide the bits in the correct order, the directions for storage and retrieval are reversed. Accordingly, bits that are read from the memory array 14 are stored in the register 12 in the second direction, and bits that are to be outputted from the memory device 10 are read from the register 12 in the first direction.

In this example, the bits are identified by a letter and a number, and the different letters indicate different word (i.e., groups of bits). The bits of adjacent words are sequentially stored top-to-bottom in the register 12. Accordingly, the bits of word A are stored in the first column of the register 12, the bits of word B are stored in the second column of the register 12, etc. Because they are read from the register 12 from left to right, bits stored in the register 12 are read out into the memory array 14 in a row-by-row fashion (i.e., A0 B0 C0 D0). As a result, when the bits read from the register 12 are stored in the memory array 14, bits that were adjacent to one another when provided to the memory device 10 are stored in non-adjacent storage locations in the memory array 14. In this example, adjacent bits provided to the memory device 10 are separated from each other by four storage locations (e.g., A0 is four storage locations from A1). This distribution of bits in the memory array 14 reduces the likelihood that adjacent bits provided to the memory device 10 will be affected by a local defect in the memory array 14. For example, as shown by the shaded area in FIG. 1A, if a local defect affects two adjacent memory locations, one bit of two different words is affected instead of two bits of a single word.

Figure 1B:
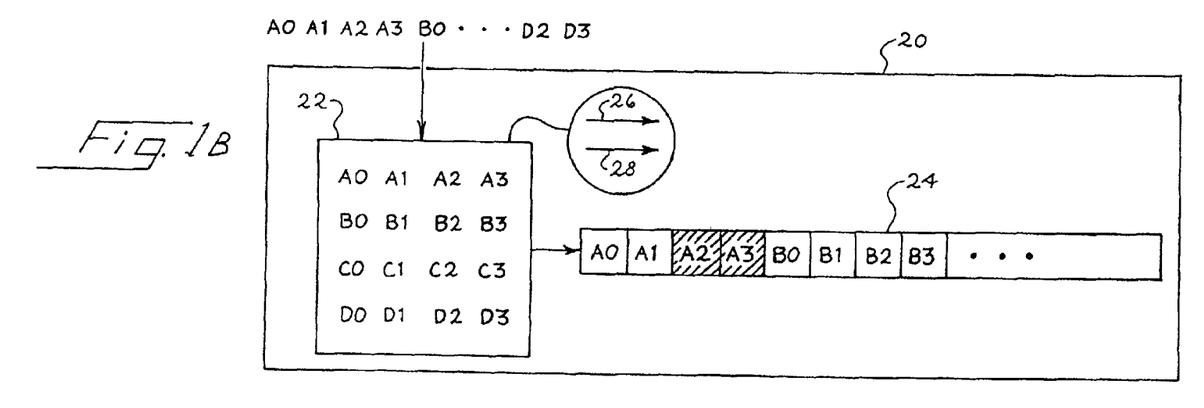
FIG. 1B is an illustration of a memory device of a preferred embodiment comprising a memory array and a register that stores and reads bits in the same direction.

By way of comparison, FIG. 1B is an illustration of a memory device 20 comprising a register 22 that stores and reads bits in the same direction (here, left to right, as indicated by arrows 26 and 28). Because bits are stored and read from the register 22 in the same direction, adjacent bits provided to the memory device 20 are stored in adjacent locations in the memory array 24. Accordingly, if a local defect affects the two adjacent memory locations shown by the shaded area in FIG. 1B, two bits of a single word are affected.

While they can be used to store any plurality of bits, these preferred embodiments provide particular advantage when used to store error correcting code ("ECC") words. As used herein, the term "ECC word" refers to a string of bits, some of which are data bits and others of which are ECC syndrome bits generated from the data bits. By physically separating out bits of an ECC word in the memory array, local defects that impact multiple storage locations are distributed across multiple ECC words, each of which can tolerate a small number of defects. Accordingly, distributing bits of an ECC word to non-adjacent storage locations in the memory array (which is referred to herein as "bit sprinkling") allows a memory device with multiple defects to function as if it did not have any defects at all, thereby improving the overall reliability and yield of the memory device. For example, if the words stored in the memory array 14 in FIG. 1A represent ECC words, the effect of the memory defect is a correctable single-bit error in ECC words C and D. In contrast, the effect of the corresponding memory defect in the memory array 24 in FIG. 1B is an un-correctable multi-bit error in ECC word A. To provide the best protection against multi-bit errors in an ECC word, it is preferred to store bits of an ECC word across as wide a space as possible in the memory array and to maximize the physical distance in the memory array between any two bits within the ECC word.

Figure 2A:
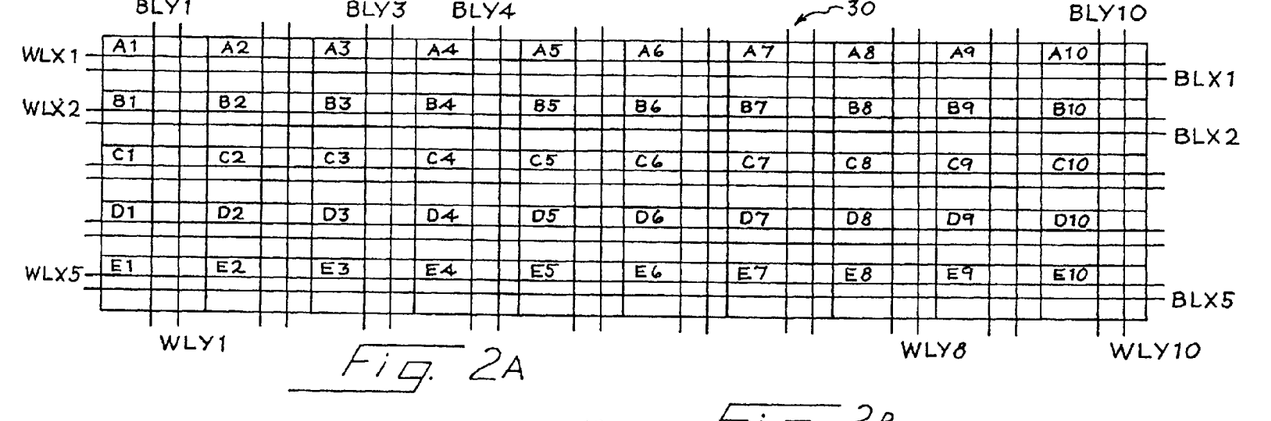
FIG. 2A is an illustration of a register of a preferred embodiment having two sets of wordlines and bitlines.

Turning again to the drawings, FIG. 2A is an illustration of a register 30 of a preferred embodiment that can be used to store bits in non-adjacent storage locations in a memory array. The register 30 is preferably implemented using SRAM. The register 30 has 50 storage locations and is organized in a 5×10 matrix. (Unlike the above example, the letters and numbers shown in this figure represent storage locations in the register and not necessarily bits in a word.) Each memory location in the register 30 is accessed by activating the appropriate wordline and bitline. Unlike conventional registers, the register 30 of this preferred embodiment comprises a dual set of wordlines and bitlines, which enables the register to read and store bits in different directions. A first set of wordlines (WLX1–WLX5) and bitlines (BLY1–BLY10) runs along the rows and columns, respectively, of the matrix. A second set of wordlines (WLY1–WLY10) and bitlines (BLX1–BLX5) is orthogonal to the first set and runs along the columns and rows, respectively, of the matrix. During a write operation, the WLX and BLY pairs are used to store bits that are provided to the memory device, and the WLY and BLX pairs are used to read bits into the memory array. During a read operation, the WLY and BLX pairs are used to store bits that are read from the memory array, and the WLX and BLY pairs are used to read bits out of the memory device.

Figure 2B:
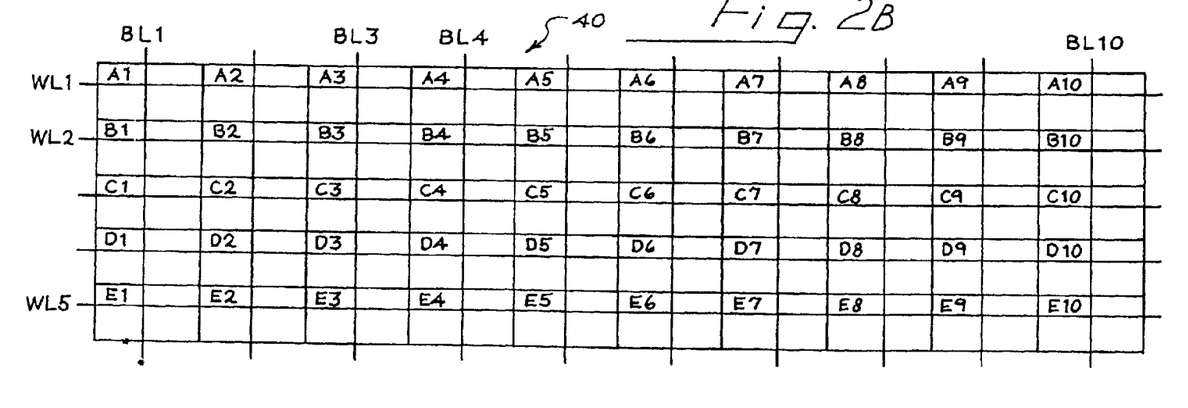
FIG. 2B is an illustration of a register of a preferred embodiment having a single set of wordlines and bitlines.

By way of comparison, FIG. 2B illustrates a register 40 that has only a single pair of wordlines (WL1–WL5) and bitlines (BL1–BL10), which are used to store bits in and read bits from the register 40 in the same direction during both read and write operations. In this register 40, the number of active bitlines determines the number of bits that can be accessed in parallel. For example, activating WL2 enables the second row, and activating BL3 and BL4 selects the third and fourth columns, thereby selecting memory locations B3 and B4. The number of active bitlines also determines the number of bits that can be accessed in parallel in the register 30 in FIG. 2A. For example, activating WLX2 along with BLY3 and BLY4 selects memory locations B3 and B4, while activating WLY8 in conjunction with BLX4 and BLX5 selects memory locations D8 and E8.

Figure 3:
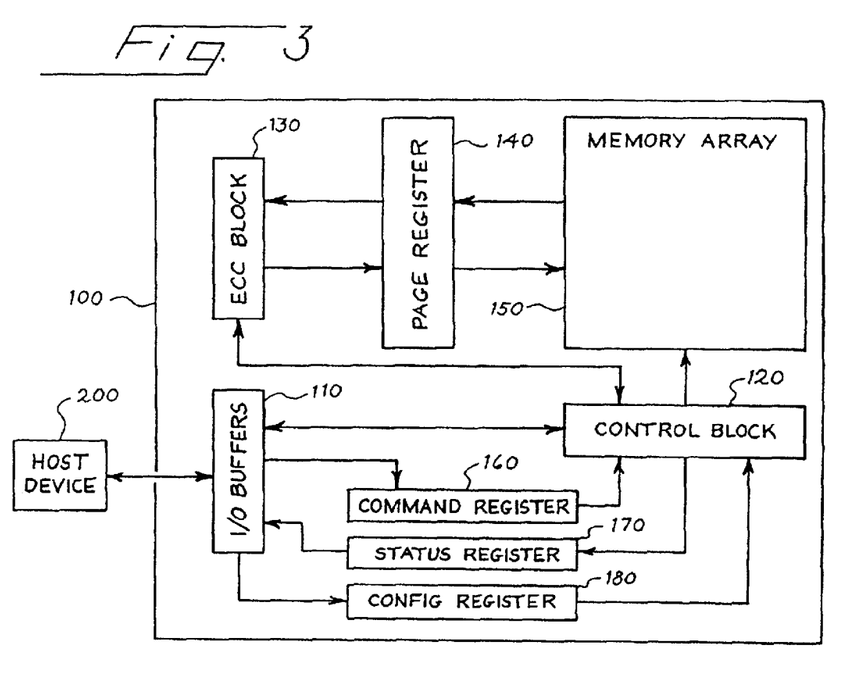
FIG. 3 is a block diagram of a memory device coupled with a host device of a preferred embodiment.

Turning again to the drawings, FIG. 3 shows a memory device 100 of a preferred embodiment coupled with a host device 200. As shown in FIG. 3, the memory device 100 comprises I/O buffers 110, a control block 120, an ECC block 130, a page register 140, a memory array 150, a command register 160, a status register 170, and a configuration register 180. The command register 160 passes commands (e.g., read, write) received from the host device 200 to the control block 120, the status register 170 holds information from the control block 120 regarding the status of certain operations (e.g., a failure during a write operation), and the configuration register 180 can be used during a test operation to instruct the control block 120 to disable ECC syndrome bit generation.

The page register 140 is a buffer structure between the memory array 150 and a Smart Media Interface (SMI) in communication with the host device 200. Bits are read from and stored in the memory array 150 a page-at-a-time, and the page register 140 holds a page of memory that is going to be stored in the memory array 150. The page register 140 also holds a page of memory that is read from the memory array 150. In this preferred embodiment, a page of memory comprises 512 bytes of main data and 64 bytes of ECC syndrome bits for that data. During a write operation, 512 bytes of data and 64 bytes of ECC syndrome bits are assembled in the page register 140 before being written into the memory array 150. In operation, the I/O buffers 110 temporarily store the incoming bytes and pass them to the control block 120. The control block 120 comprises a register that can hold eight bytes of data (an "oct-byte"). When eight bytes are stored, the oct-byte is sent from the oct-byte register to the ECC block 130, which generates a byte of ECC syndrome bits for the oct-byte. The oct-byte and its ECC syndrome byte (together, the ECC word) are then stored in the page register 140. The page register 140 is populated one oct-byte at a time until it is full (i.e., until 64 ECC words are stored in the page register 140). The contents of the page register 140 are then transferred to the memory array 150 one byte at a time. (Partial page writes, where the contents of the page register 140 are transferred to the memory array 150 before the page register 140 is completely full, can also be implemented.) During a read operation, 512 bytes of main data and 64 bytes of ECC syndrome bits are read from the memory array 150 into the page register 140 and are then serially pushed out from the SMI to the host device 200.

Figure 4:
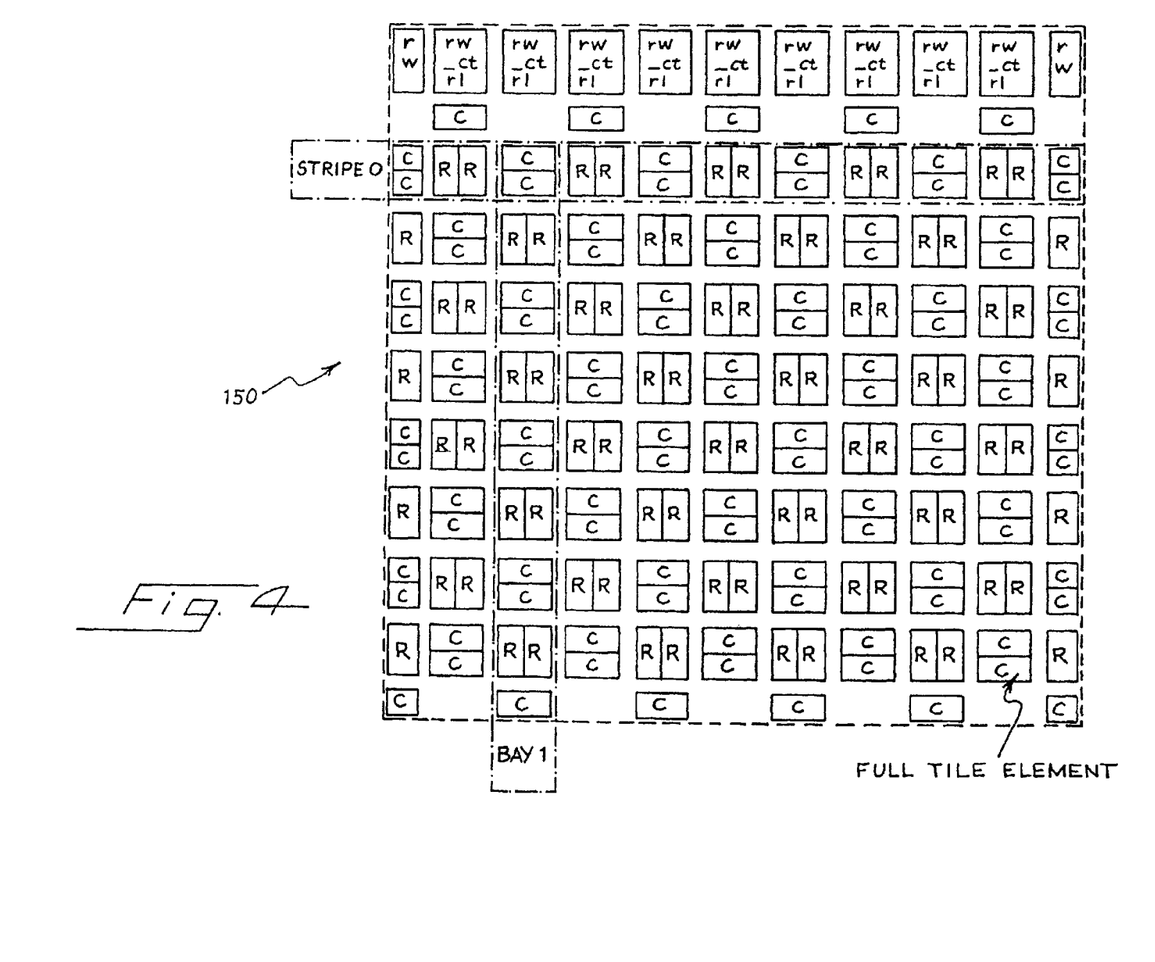
FIG. 4 is an illustration of a memory array of the memory device of FIG. 3.

Returning to the drawings, FIG. 4 is an illustration of the memory array 150. The memory array 150 comprises 88 sub-arrays (or "tiles"). As used herein, the term sub-array refers to a contiguous group of memory cells having contiguous word and bit lines generally unbroken by decoders, drivers, sense amplifiers, and input/output circuits. The core of the memory array 150 is 72 full tile elements organized in an array of eight rows (which will be referred to herein as "stripes") and nine columns (which will be referred to herein as "bays"). In this preferred embodiment, the silicon real estate under the sub-arrays is used for non-memory logic circuits, such as row and column decoders. As shown in FIG. 4, the row and column decoders, which are designated by "R"s and "C"s, respectively, are arranged under the memory array 150 in a checkerboard style to provide for a high density layout. More details on this arrangement can be found in "Memory Device with Row and Column Decoder Circuits Arranged in a Checkerboard Pattern under a Plurality of Memory Arrays," U.S. patent application Ser. No. 09/896,814, which is assigned to the assignee of the present invention and is hereby incorporated by reference.

Each sub-array comprises 1024 rows and 1024 columns in eight layers. This structure provides a main 1 MB storage element. Accordingly, the memory array 150 can store 64 MB of main data and 8 MB of syndrome bits for that data. Each sub-array also comprises eight additional rows for redundancy (in each layer). Redundancy/self-repair operations are described in "Memory Device and Method for Redundancy/Self-Repair," U.S. patent application Ser. No. 10/024,646, filed Dec. 14, 2001, which is assigned to the assignee of the present application and is hereby incorporated by reference. Further, each sub-array also comprises eight rows and four columns of test memory, half along each side of the sub-array, which contain sacrificial test bits. Alongside the 72 full sub-array elements, there are 16 smaller sub-arrays positioned in the columns along the two outer edges of the core array. The smaller sub-arrays are about ¼ the size of the full sub-arrays. Two sub-arrays on the same stripe are logically merged into a single element with 1024 rows and 512 columns. These smaller sub-arrays will be referred to herein as "spare arrays." The spare arrays are used to store sideband data, ECC bits for the sideband data, and data used for redundancy/self repair, all of which will be referred to herein as "spare data" (as compared to main data). As mentioned above, the memory array 150 in this preferred embodiment is byte addressable.

In this preferred embodiment, a memory page comprises 512 bytes of main data, 64 bytes of ECC syndrome bits for the main data, 16 bytes of spare data, two bytes of ECC syndrome bits for the spare data, and 18 bytes of redundancy/self repair and extra data. The main data and the main ECC are mapped into the nine main sub-arrays in a stripe, and the remaining information is mapped into the two minor sub-arrays in the stripe. Preferably, bays 0–3 and 5–8 store the 512 bytes of main data, bay 4 stores the ECC bits for the main data, and bay 9 stores the spare data.

Figure 5:
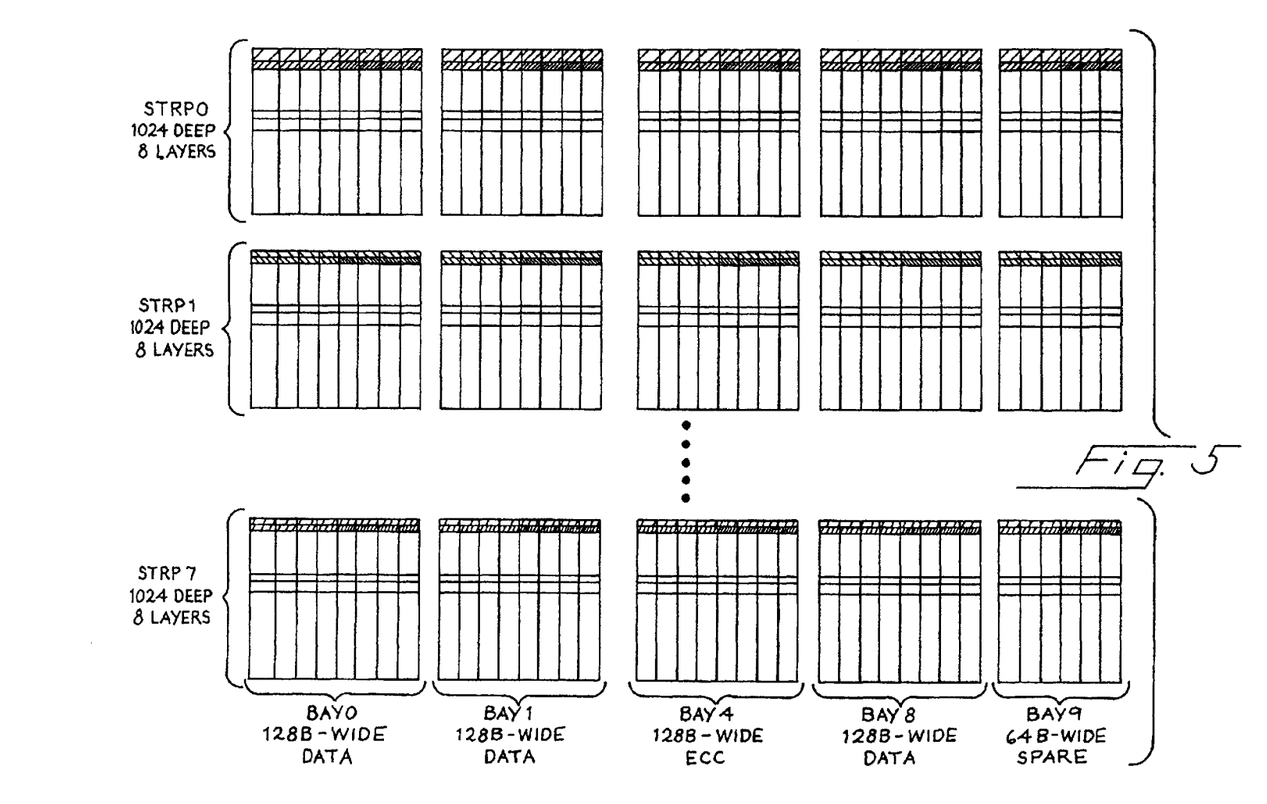
FIG. 5 is an illustration of a memory array of a preferred embodiment in which a page of memory is distributed among bays in a stripe.

In this preferred embodiment, the main data and ECC of a page are distributed among the nine sub-arrays in a stripe such that one sub-array in a stripe holds $\frac{1}{9}^{th}$ of the page. (The spare arrays will be discussed in more detail below.) FIG. 5 illustrates this arrangement, with different shadings used to depict different pages stored in the nine bays of each stripe. For example, for ECC word "A," bits A0–A7 would be stored in stripe 0, bay 0; bits A8–A15 would be stored in stripe 0, bay 1; etc. Likewise, for ECC word "B", bits B0–B7 would be stored in stripe 0, bay 0; bits B8–B15 would be stored in stripe 0, bay 1; etc. As shown by the shadings in FIG. 5, in this preferred embodiment, bits of a given page are located in the same location in each of the sub-arrays. To distribute a page of memory to the nine bays in a stripe, the page register 140 is preferably divided into nine identical blocks (or "sub-registers"), each of which contains page data for one of the nine sub-arrays in a stripe (i.e., $\frac{1}{9}^{th}$ of the page). (As described below, each sub-register can also contain page data for $\frac{1}{9}^{th}$ of what belongs to the spare array.) The read/write controllers ("rw_ctrl") on the top of each bay act as an interface between the sub-registers and the bays.

Figure 6:
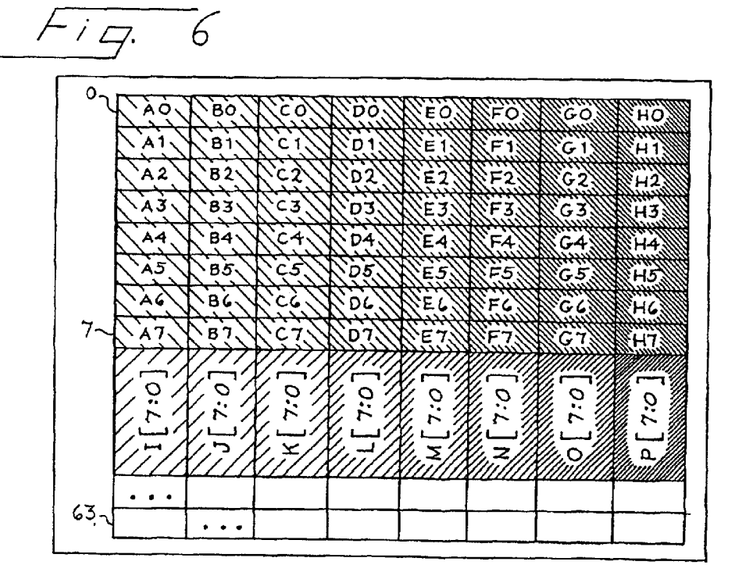
FIG. 6 is an illustration of a page sub-register of a preferred embodiment.
Figure 7:
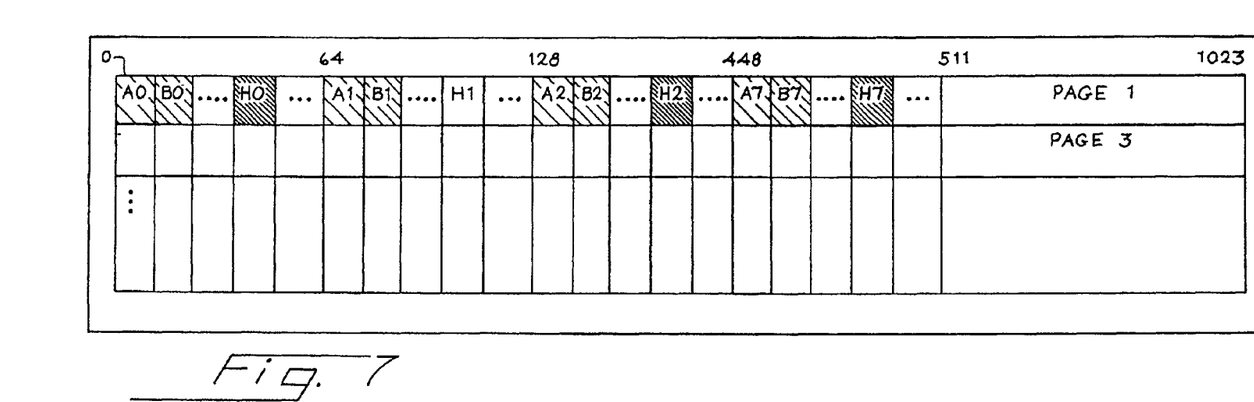
FIG. 7 is an illustration of a sub-array of a preferred embodiment.

The page register 140 in this preferred embodiment uses two sets of wordlines and bitlines, as described above, to incorporate bit sprinkling functionality to maximize the physical spacing between bits in a given oct-byte and, accordingly, to improve the effectiveness of the ECC protection. While control logic is responsible for physically mapping a page into the memory array 150, data scrambling and de-scrambling in the sub-registers is enabled as a hardware feature of the page register 140 and is transparent to the control logic. Further, the SMI logic will see the data in its original form at all times. FIG. 6 is an illustration of the page sub-register for bay 0. One byte of each word in the page is stored in the page sub-register from top to bottom. For example, bits A0–A7 of ECC word A are stored in rows 0–7 of the first column, bits B0–B7 of ECC word B are stored in rows 0–7 of the second column, etc. When bits are read out of the page sub-register and into a corresponding sub-array, the bits are read from left to right (e.g, A0 B0 C0 . . . H0). The bits read from the page sub-register are then stored in the corresponding sub-array, as illustrated in FIG. 7. (Addressing of the columns is taken care of by the column decoders in the array.) As shown in FIG. 7, because the direction that the bits were stored in the page sub-register is different from the direction that the bits were read out of the page sub-register, bits in an ECC word are located in non-adjacent locations in the memory array. Specifically, each bit is 64 storage locations apart in the sub-array (e.g., A0 is 64 storage locations apart from A1), thereby achieving maximum separation between bits of an oct-byte. Accordingly, a local manufacturing defect must be large enough to extend across 65 bit locations before causing a double-bit error within an ECC word. A defect that extends across 64 bits locations will only result in a correctable single-bit error in 64 ECC words, instead of an uncorrectable multi-bit error in a single ECC word. This enhances the yield and reliability of the memory device 100 with a minimal amount of overhead and implementation cost. The same principles described above apply to storage of the ECC syndrome bits in the sub-array in bay 4.

Figure 8:
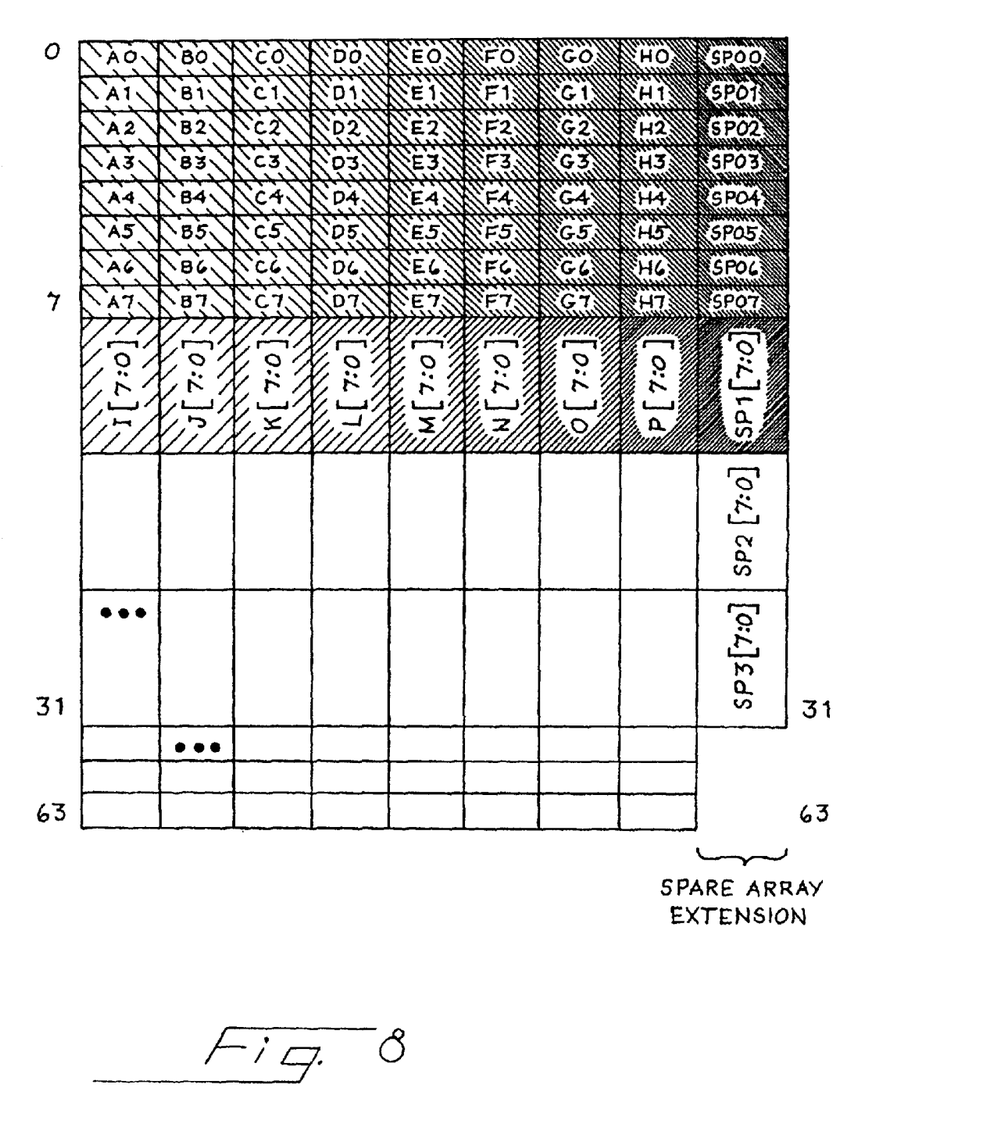
FIG. 8 is an illustration of a page sub-register of a preferred embodiment that is extended to hold a section of spare array data.
Figure 9:
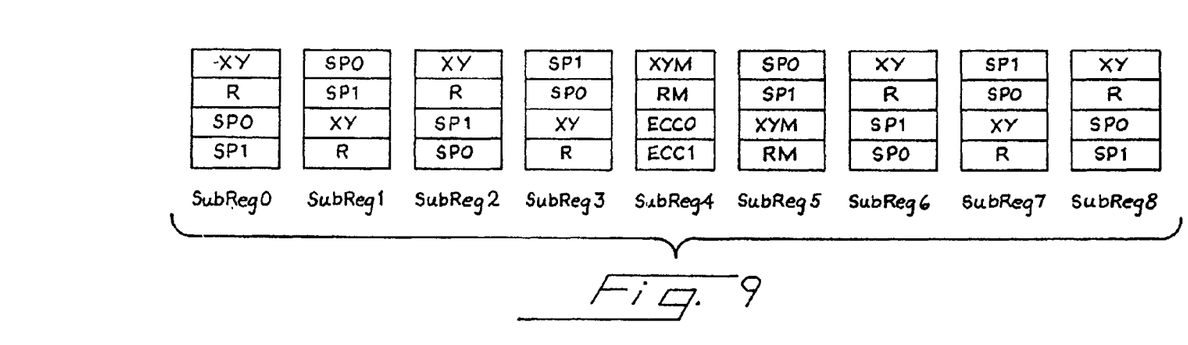
FIG. 9 is an illustration showing the location of spare array data in the extended sections of nine sub-registers of a preferred embodiment.

As discussed above, the spare array in Bay 9 is physically made up of two ¼-sized sub-arrays that logically act as a single array of 1024 rows and 512 columns (excluding redundancy and sacrificial test areas). To enable maximum separation between bits of an oct-byte in the spare array, bits are sprinkled within the page register 140. To simplify the interface between the page register 140 and the control logic, each page sub-register preferably is extended to hold a section of the spare array data as shown in FIG. 8. The addition extends the sub-register by another bit (from eight to nine) for half of its height. As the page register 140 is made of nine sub-registers, the spare array data will be contained within the extended sections of these sub-registers as shown in FIG. 9. In FIG. 9, each block represents one byte of data (one bit wide and eight bits deep). SP0 and SP1 are the spare array data (16-bytes) and ECC0 and ECC1 are their respective ECC syndrome bits. XY is used to store redundancy/self-repair data, as described in "Memory Device and Method for Redundancy/Self-Repair," U.S. patent application Ser. No. 10/024,646, filed Dec. 14, 2001, which is assigned to the assignee of the present application and is hereby incorporated by reference. R is a reserved area, which can be used to store dynamic bit inversion information, as described in "Memory Device and Method for Dynamic Bit Inversion," U.S. patent application Ser. No. 10/023,466, filed Dec. 14, 2001, which is assigned to the assignee of the present application and is hereby incorporated by reference. XYM and RM are masked bit locations in XY and R space.

Each row in FIG. 9 represents data as it will be written to the memory array 150. This scheme maximizes spacing between data bits from the same oct-byte to four bits. However, the actual spacing achieved in the memory array 150 is significantly higher as data is written into the array 150 in groups of four with a large spacing introduced in between. This will give much of the intended result of bit sprinkling. Data scrambling and de-scrambling in the sub-registers for the spare array is enabled as a hardware feature of the page register 140 and is transparent to the control circuitry. The SMI logic will see the data in its original format at all times. It is apparent that with this scheme, in every cycle, the page register 140 would provide a nine bit output to the spare memory array. In order to utilize the existing array architecture based on eight-bit R/W circuits, the RW_CTRL circuit servicing the spare array tiles preferably steps down the incoming data stream from nine bits to eight bits by multiplexing the inputs from SubReg4 and SubReg5 such that bits tagged as XYM and RM are omitted. Preferably, these bit locations are masked out by the SMI Logic so they can be ignored without causing any functionality problems.

There are several alternatives that can be used with these preferred embodiments. In the preferred embodiments described above, distribution of bits in the memory array was accomplished by the way the bits were transferred in to and out of the temporary storage register. In one alternate embodiment, the bit sprinkling functionality is performed using other mechanisms, such as special addressing techniques that use decoders to scramble bits in the memory array. For example, a column decoder (and/or row decoder) can be used to store bits in non-adjacent storage locations in a memory array associated with that decoder. However, the use of the temporary storage register is preferred because of its simplicity in design. Specifically, implementing the bit sprinkling hardware in a single component (the page register) is simpler than implementing the bit sprinkling hardware in several components (the column and/or row decoders associated with every sub-array). Accordingly, using a temporary storage register for bit sprinkling greatly improves the effectiveness of the ECC scheme of the memory device with a minimal amount of overhead and implementation cost in terms of complexity, area, performance, and manufacturability. In another alternate embodiment, the bit sprinkling functionality is performed by hardware and/or software in the host device instead of (or in addition to) hardware components in the memory device. For example, when a host device wants to store a plurality of bits that are arranged adjacent to one another in a memory device, hardware and/or software in the host device can provide the plurality of bits to the memory device in such a way that the memory device will store the adjacent bits in non-adjacent storage locations in the memory array. In still another alternate embodiment, instead of implementing the ECC functionality as a hardware component in the memory device, the ECC functionality can be implemented as a hardware and/or software component in the host device. Additionally, the ECC functionality can be distributed between the memory device and the host device. Further, while ECC was used to illustrate the preferred embodiments described above, other error protection schemes can be used, such as, but not limited to, Reed-Solomon, BCH, Golay, and Viterbi.

These preferred embodiments can be implemented with any suitable memory device, such as a solid-state memory device (i.e., a memory device that responds to electrical read and write signals to cause digital information to be read from and stored in a memory array of the device), a magnetic storage device (such as a hard drive), or an optical storage device (such as a CD or DVD). The memory device can be a write-once or write-many device and can comprise a two-dimensional or three-dimensional memory array of memory cells. In one preferred embodiment, the memory device takes the form of a solid-state memory device having a three-dimensional array of write-once memory cells, as described in U.S. Pat. No. 6,034,882 to Johnson et al., U.S. Pat. No. 5,835,396 to Zhang, and U.S. patent application Ser. No. 09/560,626, all of which are hereby incorporated by reference. As discussed in those documents, three-dimensional memory arrays provide important economies in terms of reduced size and associated reductions in manufacturing cost. Whether two- or three-dimensional, the memory array preferably comprises non-volatile passive element memory cells. Although any suitable type of memory cell can be used, in one preferred embodiment, the memory cell comprises an anti-fuse and a diode. The memory array can be made from any suitable material. In one preferred embodiment, the memory array comprises a semiconductor material. Other materials can be used, such as, but not limited to, phase-change materials and amorphous solids as well as those used with MRAM and organic passive element arrays, as described in U.S. Pat. No. 6,055,180, which is hereby incorporated by reference. It is important to note that the following claims should not be read as requiring a specific type of memory device (e.g., write-once or write-many) or specific type of memory array (e.g., two dimensional or three-dimensional) unless explicitly recited therein.

In one preferred embodiment, the memory device takes the form of a modular, compact, handheld unit, such as a memory card or stick, that comprises an external electrical connector that can be coupled with a host device, such as a digital camera, digital audio player, or other portable consumer product.

It is intended that the foregoing detailed description be understood as an illustration of selected forms that the invention can take and not as a definition of the invention. It is only the following claims, including all equivalents, that are intended to define the scope of this invention. Finally, it should be noted that any aspect of any of the preferred embodiments described herein can be used alone or in combination with one another.

What is claimed is:

1. A method for storing bits of an ECC word in non-adjacent storage locations in a memory array of a memory device, the method comprising:
    (a) providing a memory device comprising a register and a memory array coupled with the register;
    (b) storing an ECC word in the register in a first direction;
    (c) reading the ECC word from the register in a second direction; and
    (d) storing bits of the ECC word in non-adjacent storage locations in the memory array.

2. The invention of claim 1, wherein the first direction is orthogonal to the second direction.

3. The invention of claim 1, wherein the memory array comprises a plurality of sub-arrays, and wherein the register comprises a plurality of sub-registers, each sub-register being associated with a respective sub-array.

4. The invention of claim 1, wherein adjacent bits of the ECC word are separated by 64 storage locations in the memory array.

5. The invention of claim 1, wherein the memory array comprises a plurality of write-once memory cells.

6. The invention of claim 1, wherein the memory array comprises a three-dimensional array of memory cells.

7. The invention of claim 1, wherein the memory array comprises a semiconductor material.

8. A method for storing bits in non-adjacent storage locations in a memory array of a memory device, the method comprising:
    (a) providing a memory device comprising a register and a memory array coupled with the register;
    (b) providing a plurality of bits to the memory device;
    (c) storing the plurality of bits in the register in a first direction;
    (d) reading the plurality of bits from the register in a second direction, wherein an order in which the plurality of bits are read from the register is different from an order in which the plurality of bits are stored in the register, whereby bits that are adjacent to one another when provided to the memory device are not adjacent to one another when read from the register; and
    (e) storing the plurality of bits in the memory array, wherein bits that are adjacent to one another when provided to the memory device are stored in non-adjacent storage locations in the memory array.

9. The invention of claim 8, wherein the plurality of bits comprises bits of an ECC word.

10. The invention of claim 8, wherein the first direction is orthogonal to the second direction.

11. The invention of claim 8 further comprising:
    (f) reading the plurality of bits stored in (e) from the memory array;
    (g) storing the plurality of bits read in (f) in the register in the second direction; and
    (h) reading the plurality of bits stored in (g) from the register in the first direction.

12. The invention of claim 8, wherein the memory array comprises a plurality of sub-arrays, and wherein the register comprises a plurality of sub-registers, each sub-register being associated with a respective sub-array.

13. The invention of claim 8, wherein bits that are adjacent to one another when provided to the memory device are separated by 64 storage locations in the memory array.

14. The invention of claim 8, wherein the memory array comprises a plurality of write-once memory cells.

15. The invention of claim 8, wherein the memory array comprises a three-dimensional array of memory cells.

16. The invention of claim 8, wherein the memory array comprises a semiconductor material.

17. A memory device comprising:
    a memory array; and
    a register coupled with the memory array, the register comprising:
        a first set of wordlines and bitlines; and
        a second set of wordlines and bitlines orthogonal to the first set of wordlines and bitlines.

18. The invention of claim 17, wherein the first set of wordlines and bitlines is operative to store bits received by the memory device, and wherein the second set of wordlines and bitlines is operative to read bits that are to be stored in the memory array.

19. The invention of claim 18, wherein the first set of wordlines and bitlines is further operative to read bits that are to be outputted from the memory device, and wherein the second set of wordlines and bitlines is further operative to store bits that are received from the memory array.

20. The invention of claim 17, wherein the memory array comprises a plurality of sub-arrays, and wherein the register comprises a plurality of sub-registers, each sub-register being associated with a respective one of the plurality of sub-arrays.

21. The invention of claim 17, wherein the memory array comprises a plurality of write-once memory cells.

22. The invention of claim 17, wherein the memory array comprises a three-dimensional array of memory cells.

23. The invention of claim 17, wherein the memory array comprises a semiconductor material.

24. A method for storing bits in non-adjacent storage locations in a memory array of a memory device, the method comprising:
    (a) providing a memory device comprising a memory array, a column decoder, and a row decoder;
    (b) providing a plurality of bits to the memory device; and
    (c) with at least one of the column decoder and row decoder, storing the plurality of bits in the memory array such that bits that are adjacent to one another when provided to the memory device are stored in non-adjacent storage locations in the memory array.

25. The invention of claim 24, wherein the plurality of bits comprises bits of an ECC word.

26. The invention of claim 24, wherein the memory array comprises a plurality of sub-arrays, and wherein the memory device comprises a plurality of column decoders and row decoders.

27. The invention of claim 24, wherein the memory array comprises a plurality of write-once memory cells.

28. The invention of claim 24, wherein the memory array comprises a three-dimensional array of memory cells.

29. The invention of claim 24, wherein the memory array comprises a semiconductor material.

30. A method for storing bits in non-adjacent storage locations in a memory array of a memory device, the method comprising:
   (a) providing a host device coupled with a memory device comprising a memory array;
   (b) with the host device, re-ordering a plurality of bits such that bits that are adjacent to one another before the re-ordering are not adjacent to one another after the re-ordering;
   (c) with the host device, providing the re-ordered plurality of bits to the memory device; and
   (d) with the memory device, storing the re-ordered plurality of bits in the memory array in the same order as provided to the memory device by the host device.

31. A method for storing bits in non-adjacent storage locations in a memory array of a memory device, the method comprising:
   (a) providing a host device coupled with a memory device comprising a memory array;
   (b) providing a plurality of bits arranged adjacent to one another; and
   (c) with the host device providing the plurality of bits to the memory device such that the memory device will store adjacent bits of the plurality of bits in non-adjacent storage locations in the memory array;
   wherein the plurality of bits comprises bits of an ECC word.

32. A method for storing bits in non-adjacent storage locations in a memory array of a memory device, the method comprising:
   (a) providing a host device coupled with a memory device comprising a memory array;
   (b) providing a plurality of bits arranged adjacent to one another; and
   (c) with the host device providing the plurality of bits to the memory device such that the memory device will store adjacent bits of the plurality of bits in non-adjacent storage locations in the memory array;
   wherein the memory array comprises a plurality of write-once memory cells.

33. A method for storing bits in non-adjacent storage locations in a memory array of a memory device, the method comprising:
   (a) providing a host device coupled with a memory device comprising a memory array;
   (b) providing a plurality of bits arranged adjacent to one another; and
   (c) with the host device providing the plurality of bits to the memory device such that the memory device will store adjacent bits of the plurality of bits in non-adjacent storage locations in the memory array;
   wherein the memory array comprises a three-dimensional array of memory cells.

34. A method for storing bits in non-adjacent storage locations in a memory array of a memory device, the method comprising:
   (a) providing a host device coupled with a memory device comprising a memory array;
   (b) providing a plurality of bits arranged adjacent to one another; and
   (c) with the host device providing the plurality of bits to the memory device such that the memory device will store adjacent bits of the plurality of bits in non-adjacent storage locations in the memory array;
   wherein the memory array comprises a semiconductor material.

* * * * *